US009954955B2

(12) United States Patent
Davis et al.

(10) Patent No.: US 9,954,955 B2
(45) Date of Patent: Apr. 24, 2018

(54) VEHICLE RADAR SYSTEM WITH A SHARED RADAR AND COMMUNICATION SYSTEM

(71) Applicant: UHNDER, INC., Austin, TX (US)

(72) Inventors: Curtis Davis, St. Louis, MO (US);
Manju Hegde, St. Louis, MO (US);
Wayne E. Stark, Ann Arbor, MI (US);
Aria Eshraghi, Austin, TX (US);
Marius Goldenberg, Austin, TX (US);
Murtaza Ali, Cedar Park, TX (US)

(73) Assignee: Uhnder, Inc., Austin, TX (US)

( * ) Notice: Subject to any disclaimer, the term of this patent is extended or adjusted under 35 U.S.C. 154(b) by 0 days.

(21) Appl. No.: 15/496,039

(22) Filed: Apr. 25, 2017

(65) Prior Publication Data
US 2017/0310758 A1    Oct. 26, 2017

Related U.S. Application Data

(60) Provisional application No. 62/327,017, filed on Apr. 25, 2016.

(51) Int. Cl.
*G01S 13/02*      (2006.01)
*H04L 29/08*      (2006.01)
(Continued)

(52) U.S. Cl.
CPC ............. *H04L 67/12* (2013.01); *G01S 7/006* (2013.01); *G01S 13/0209* (2013.01);
(Continued)

(58) Field of Classification Search
CPC .................................................. G01S 13/931
(Continued)

(56) References Cited

U.S. PATENT DOCUMENTS 1,882,128 A    10/1932    Fearing
3,374,478 A     3/1968    Blau
(Continued)

FOREIGN PATENT DOCUMENTS

EP    0725480    11/2011
EP    2374217     4/2013
(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.
(Continued)

*Primary Examiner* — Timothy A Brainard
(74) *Attorney, Agent, or Firm* — Gardner, Linn, Burkhart & Ondesma, LLP

(57) ABSTRACT

A shared radar and communication system for a vehicle includes capabilities for radar detection and communication with vehicles equipped with similar systems. The radar system is equipped with pluralities of transmit antennas and pluralities of receive antennas. The radar transmits a signal modulated with spread codes that are information bits. A receiver discriminates the signals sent from own transmitters and multiple reflections to detect objects of interest. In addition, the receiver discriminates signals transmitted from different systems on other vehicles. This requires the receiving system to have knowledge of the codes transmitted by the other vehicle. The receiving system determines the information bits sent by the other vehicle. If multiple radar systems on multiple vehicles use different sets of codes (but known to each other), the multiple systems can create a
(Continued)

communication infra-structure in addition to radar detection and imaging.

24 Claims, 13 Drawing Sheets

(51) Int. Cl.
G01S 7/00 (2006.01)
G01S 13/87 (2006.01)
G01S 13/93 (2006.01)
H04J 13/12 (2011.01)
H04L 27/20 (2006.01)

(52) U.S. Cl.
CPC .......... G01S 13/878 (2013.01); G01S 13/931 (2013.01); H04J 13/12 (2013.01); H04L 27/2003 (2013.01); G01S 2013/9321 (2013.01)

(58) Field of Classification Search
USPC ................................. 342/70–72, 16
See application file for complete search history.

(56) References Cited

U.S. PATENT DOCUMENTS

| | | | |
|---|---|---|---|
| 3,735,395 A | 5/1973 | Ross | |
| 3,750,169 A | 7/1973 | Strenglein | |
| 3,896,434 A | 7/1975 | Sirven | |
| 4,078,234 A | 3/1978 | Fishbein et al. | |
| 4,176,351 A | 11/1979 | De Vita et al. | |
| 4,566,010 A | 1/1986 | Collins | |
| 4,939,685 A | 7/1990 | Feintuch | |
| 5,001,486 A | 3/1991 | Bächtiger | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,280,288 A | 1/1994 | Sherry et al. | |
| 5,302,956 A | 4/1994 | Asbury et al. | |
| 5,341,141 A | 8/1994 | Frazier et al. | |
| 5,345,470 A | 9/1994 | Alexander | |
| 5,379,322 A | 1/1995 | Kosaka et al. | |
| 5,508,706 A | 4/1996 | Tsou et al. | |
| 5,657,023 A | 8/1997 | Lewis et al. | |
| 5,712,640 A | 1/1998 | Andou et al. | |
| 5,724,041 A | 3/1998 | Inoue et al. | |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A | 9/1999 | Aoyagi et al. | |
| 5,970,400 A | 10/1999 | Dwyer | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,191,726 B1 | 2/2001 | Tullsson | |
| 6,184,829 B1 | 9/2001 | Stilp | |
| 6,288,672 B1 | 9/2001 | Asano et al. | |
| 6,307,622 B1 | 10/2001 | Lewis | |
| 6,347,264 B2 | 2/2002 | Nicosia et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,714,956 B1 | 3/2004 | Liu et al. | |
| 6,747,595 B2 | 6/2004 | Hirabe | |
| 6,768,391 B1 | 7/2004 | Dent et al. | |
| 6,975,246 B1 | 12/2005 | Trudeau | |
| 7,119,739 B1 | 10/2006 | Struckman | |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,395,084 B2 | 7/2008 | Anttila | |
| 7,460,055 B2 | 12/2008 | Nishijima et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,567,204 B2 | 7/2009 | Sakamoto | |
| 7,609,198 B2 | 10/2009 | Chang | |
| 7,642,952 B2 | 1/2010 | Fukuda | |
| 7,663,533 B2 | 2/2010 | Toennesen | |
| 7,728,762 B2 | 6/2010 | Sakamoto | |
| 7,791,528 B2 | 9/2010 | Klotzbuecher | |
| 7,847,731 B2 | 12/2010 | Wiesbeck | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,154,436 B2 | 4/2012 | Szajnowski | |
| 8,330,650 B2 | 12/2012 | Goldman | |
| 8,390,507 B2 | 3/2013 | Wintermantel | |
| 8,471,760 B2 | 6/2013 | Szajnowski | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 9,121,943 B2 | 9/2015 | Stirling-Gallacher et al. | |
| 9,239,378 B2 | 1/2016 | Kishigami et al. | |
| 9,239,379 B2 | 1/2016 | Burgio et al. | |
| 9,282,945 B2 | 3/2016 | Smith et al. | |
| 9,335,402 B2 | 5/2016 | Maeno et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 9,753,121 B1 | 9/2017 | Davis et al. | |
| 9,772,397 B1 | 9/2017 | Bordes et al. | |
| 9,791,551 B1 | 10/2017 | Eshraghi et al. | |
| 9,791,564 B1 | 10/2017 | Harris et al. | |
| 9,806,914 B1 | 10/2017 | Bordes et al. | |
| 9,829,567 B1 | 11/2017 | Davis et al. | |
| 9,846,228 B2 | 12/2017 | Davis et al. | |
| 2001/0002919 A1 | 6/2001 | Sourour et al. | |
| 2002/0004692 A1 | 1/2002 | Nicosia et al. | |
| 2002/0044082 A1 | 4/2002 | Woodington et al. | |
| 2002/0075178 A1* | 6/2002 | Woodington | B60K 31/0008 342/27 |
| 2002/0118522 A1 | 8/2002 | Ho et al. | |
| 2002/0130811 A1 | 9/2002 | Voigtaender | |
| 2002/0147534 A1 | 10/2002 | Delcheccolo et al. | |
| 2002/0155811 A1 | 10/2002 | Prismantas | |
| 2003/0001772 A1 | 1/2003 | Woodington et al. | |
| 2003/0011519 A1 | 1/2003 | Breglia et al. | |
| 2003/0058166 A1 | 3/2003 | Hirabe | |
| 2003/0102997 A1 | 6/2003 | Levin et al. | |
| 2003/0235244 A1 | 12/2003 | Pessoa et al. | |
| 2004/0012516 A1 | 1/2004 | Schiffmann | |
| 2004/0015529 A1 | 1/2004 | Tanrikulu et al. | |
| 2004/0066323 A1 | 4/2004 | Richter | |
| 2004/0138802 A1 | 7/2004 | Kuragaki et al. | |
| 2005/0069162 A1 | 3/2005 | Haykin | |
| 2005/0156780 A1 | 7/2005 | Bonthron et al. | |
| 2005/0201457 A1 | 9/2005 | Allred et al. | |
| 2005/0225476 A1 | 10/2005 | Hoetzel et al. | |
| 2006/0012511 A1 | 1/2006 | Dooi et al. | |
| 2006/0036353 A1 | 2/2006 | Wintermantel | |
| 2006/0050707 A1 | 3/2006 | Sterin | |
| 2006/0093078 A1 | 5/2006 | Lewis et al. | |
| 2006/0109170 A1 | 5/2006 | Voigtlaender et al. | |
| 2006/0109931 A1 | 5/2006 | Asai | |
| 2006/0114324 A1* | 6/2006 | Farmer | G01S 7/003 348/144 |
| 2006/0140249 A1 | 6/2006 | Kohno | |
| 2006/0181448 A1 | 8/2006 | Natsume et al. | |

(56) References Cited

U.S. PATENT DOCUMENTS

| | | |
|---|---|---|
| 2006/0262007 A1 | 11/2006 | Bonthron et al. |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0109175 A1 | 5/2007 | Fukuda |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1* | 7/2007 | Suzuki ............ G01S 7/006 342/70 |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0279303 A1 | 12/2007 | Schoebel |
| 2008/0208472 A1 | 8/2008 | Morcom |
| 2008/0272955 A1 | 11/2008 | Yonak et al. |
| 2009/0015459 A1 | 1/2009 | Mahler et al. |
| 2009/0015464 A1 | 1/2009 | Fukuda |
| 2009/0051581 A1 | 2/2009 | Hatono |
| 2009/0073025 A1 | 3/2009 | Inoue et al. |
| 2009/0079617 A1* | 3/2009 | Shirakawa ......... G01S 13/325 342/146 |
| 2009/0085827 A1 | 4/2009 | Orime et al. |
| 2009/0121918 A1 | 5/2009 | Shirai et al. |
| 2009/0212998 A1 | 8/2009 | Szajnowski |
| 2009/0237293 A1* | 9/2009 | Sakuma ............ G01S 5/0072 342/146 |
| 2009/0267822 A1 | 10/2009 | Shinoda et al. |
| 2009/0289831 A1 | 11/2009 | Akita |
| 2009/0295623 A1 | 12/2009 | Falk |
| 2010/0116365 A1* | 5/2010 | McCarty ............ F16K 37/00 137/554 |
| 2010/0156690 A1 | 6/2010 | Kim et al. |
| 2010/0198513 A1* | 8/2010 | Zeng ............ B60W 40/02 701/300 |
| 2010/0277359 A1 | 11/2010 | Ando |
| 2011/0006944 A1 | 1/2011 | Goldman |
| 2011/0032138 A1 | 2/2011 | Krapf |
| 2011/0187600 A1 | 8/2011 | Landt |
| 2011/0196568 A1 | 8/2011 | Nickolaou |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2012/0001791 A1 | 1/2012 | Wintermantel |
| 2012/0050093 A1 | 3/2012 | Heilmann et al. |
| 2012/0112957 A1 | 5/2012 | Nguyen et al. |
| 2012/0133547 A1 | 5/2012 | MacDonald et al. |
| 2012/0173246 A1 | 7/2012 | Choi et al. |
| 2012/0257643 A1 | 10/2012 | Wu et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1* | 1/2013 | Chowdhury ............ G01S 7/032 342/94 |
| 2013/0069818 A1 | 3/2013 | Shirakawa et al. |
| 2013/0102254 A1 | 4/2013 | Cyzs et al. |
| 2013/0113653 A1 | 5/2013 | Kishigami et al. |
| 2013/0135140 A1 | 5/2013 | Kishigami |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1* | 2/2014 | Khlifi ............ G01S 7/006 342/21 |
| 2014/0070985 A1 | 3/2014 | Vacanti |
| 2014/0085128 A1 | 3/2014 | Kishigami et al. |
| 2014/0111372 A1 | 4/2014 | Wu |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0285373 A1 | 9/2014 | Kuwahara et al. |
| 2014/0327566 A1 | 11/2014 | Burgio et al. |
| 2014/0348253 A1 | 11/2014 | Mobasher et al. |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1* | 3/2015 | Kishigami ............ G01S 7/2813 342/147 |
| 2015/0103745 A1 | 4/2015 | Negus et al. |
| 2015/0198709 A1 | 7/2015 | Inoue |
| 2015/0204966 A1 | 7/2015 | Kishigami |
| 2015/0204971 A1 | 7/2015 | Kuehnle |
| 2015/0226848 A1 | 8/2015 | Park |
| 2015/0234045 A1 | 8/2015 | Rosenblum |
| 2015/0247924 A1 | 9/2015 | Kishigami |
| 2015/0301172 A1 | 10/2015 | Ossowska |
| 2015/0323660 A1 | 11/2015 | Hampikian |
| 2015/0331090 A1 | 11/2015 | Jeong et al. |
| 2016/0003939 A1* | 1/2016 | Stainvas Olshansky ............ G01S 13/02 342/146 |
| 2016/0018511 A1 | 1/2016 | Nayyar et al. |
| 2016/0033631 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Hassan |
| 2016/0084943 A1 | 3/2016 | Arage |
| 2016/0139254 A1 | 5/2016 | Wittenberg |
| 2016/0238694 A1 | 8/2016 | Kishigami |
| 2017/0023661 A1 | 1/2017 | Richert |
| 2017/0293025 A1 | 10/2017 | Davis et al. |
| 2017/0293027 A1 | 10/2017 | Stark et al. |
| 2017/0307728 A1 | 10/2017 | Eshraghi et al. |
| 2017/0309997 A1 | 10/2017 | Alland et al. |
| 2017/0310758 A1 | 10/2017 | Davis et al. |
| 2017/0336495 A1 | 11/2017 | Davis et al. |

FOREIGN PATENT DOCUMENTS

| | | |
|---|---|---|
| EP | 2821808 | 1/2015 |
| FR | 2751086 | 1/1998 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017/187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

International Search Report and Written Opinion dated Sep. 8, 2017 from corresponding PCT Application No. PCT/IB2017/052361.

* cited by examiner

VEHICLE RADAR SYSTEM WITH A SHARED RADAR AND COMMUNICATION SYSTEM

CROSS REFERENCE TO RELATED APPLICATION

The present application claims the filing benefits of U.S. provisional application, Ser. No. 62/327,017, filed Apr. 25, 2016, which is hereby incorporated by reference herein in its entirety.

The present invention is directed to radar systems, and more particularly to radar systems for vehicles.

BACKGROUND OF THE INVENTION

The use of radar to determine range and velocity of objects in an environment is important in a number of applications including automotive radar and gesture detection. A radar system typically transmits radio signals and listens for the reflection of the radio signals from objects in the environment. By comparing the transmitted radio signals with the received radio signals, a radar system can determine the distance to an object. Using multiple transmissions, the velocity of an object can be determined. Using multiple transmitters and receivers, the location (angle) of an object can also be determined.

SUMMARY OF THE INVENTION

Methods and systems of the present invention provide for a shared radar and communication system that simultaneously operates as a radar (for detecting and estimating location and velocity of objects in the environment) as well as a communication system that sends and/or receives information bits to and from other systems with similar capabilities. The system operates under a variety of environments, with a variety of external information, and with a variety of objective functions to modify the transmission and reception processing at a given time to optimize the system with respect to a given objective function. This radar and communication system is designed to act in complimentary fashion. Information available from radar may be used for improving communication performance and vice versa.

A shared radar and communication system for a vehicle in accordance with an embodiment of the present invention includes the use of same signaling schemes for both radar operation and communication of information bits.

In an aspect of the invention, a PMCW-based signaling scheme transmits information by the choice of spreading code used. In accordance with another aspect of the invention, the information bits are modulated on top of the spreading code.

A shared radar and communication system for a vehicle in accordance with an embodiment of the present invention includes at least one transmitter, at least one receiver, at least one antenna, a memory, and a control processor. The at least one transmitter is configured for installation and use on a vehicle. The at least one transmitter is operable to or configured to transmit a radio signal. The transmitted radio signal is generated by up-converting a baseband transmitted signal. The baseband signal is modulated with desired information bits. The at least one receiver is configured for installation and use on the vehicle and is operable to or configured to receive a reflected radio signal. The reflected radio signal is the transmitted radio signal(s) reflected from an object or multiple objects. The at least one receiver is also operable to or configured to receive radio signals transmitted by other similar systems. The radar system includes one or more receivers. In each receiver, the received radio signal is down-converted (with in-phase and quadrature signals), and then sampled and quantized using an analog-to-digital converter (ADC) to produce possibly complex baseband samples. The resulting complex signal from the ADC is processed by a digital processor. The control processor is operable to or configured to change the characteristics of the transmitted signal and to change the way the receiver processes the reflected radio signal to generate estimates of range, velocity, and angle of objects in the environment and at the same time enable communications with other similar systems. The change of the characteristics can be in response to (i) radar detection information, (ii) information received over communications with other similar systems, and (iii) in response to information available from external devices, such as a vision-based system.

These and other objects, advantages, purposes and features of the present invention will become apparent upon review of the following specification in conjunction with the drawings.

DESCRIPTION OF THE PREFERRED EMBODIMENTS

Figure 1:
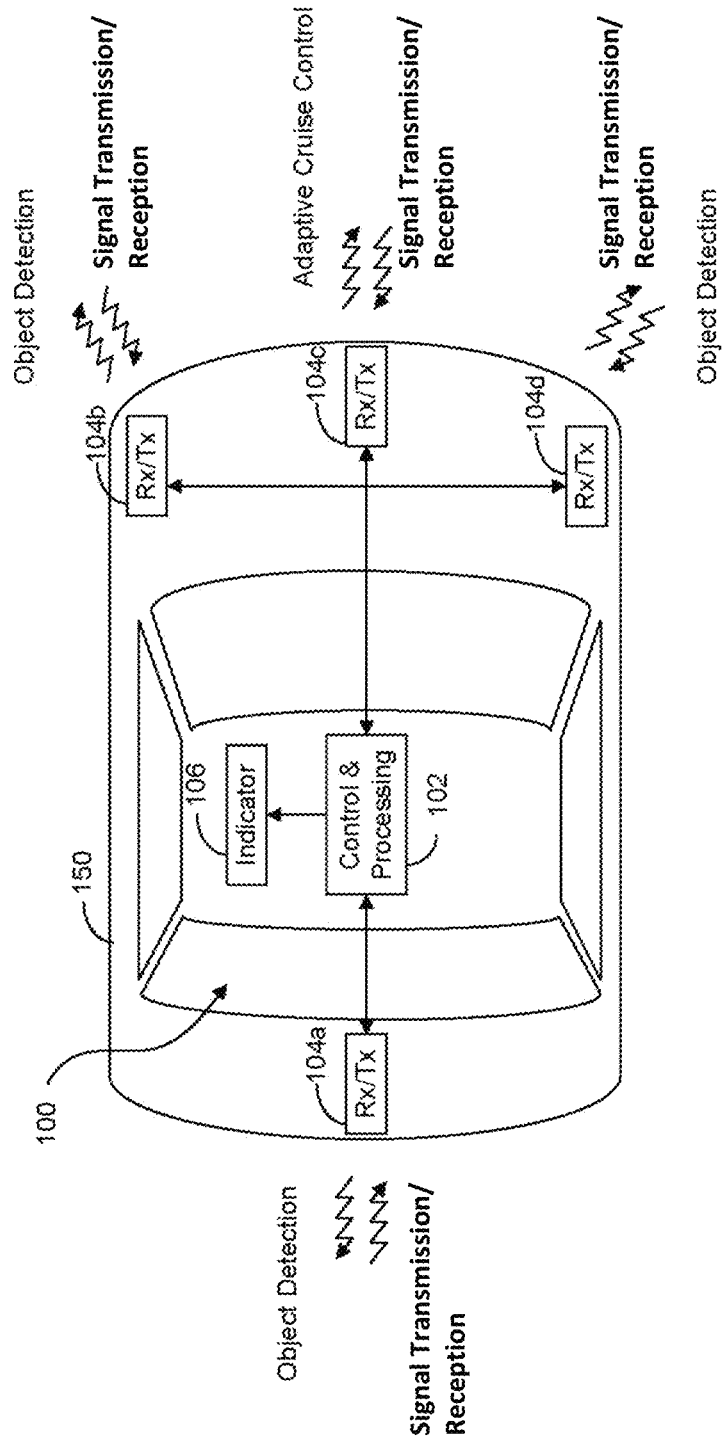
FIG. 1 is a plan view of an automobile equipped with a shared radar and communication system, in accordance with the present invention.

The present invention will now be described with reference to the accompanying figures, wherein numbered elements in the following written description correspond to like-numbered elements in the figures. Methods and systems of the present invention achieve radar and communication capabilities on a same system. Radar signaling is based on signals which have good auto and cross correlation properties. Information bits are encoded into these signals while maintaining the same correlation properties.

There are several types of signals used in different types of radar systems. One type of radar signal is known as a frequency-modulated continuous waveform (FMCW). In an FMCW radar system, the transmitter of the radar system sends a continuous signal in which the frequency of the signal varies. This is sometimes called a chirp radar system. Mixing (multiplying) the reflected wave from an object with a replica of the transmitted signal results in a CW signal with a frequency that represents the distance between the radar transmitter/receiver and the object. By sweeping up in frequency and then down in frequency, the Doppler frequency can also be determined.

Another type of radar signal is known as a phase-modulated continuous waveform (PMCW). For this type of radio signal, the phase of the transmitted signal is modulated according to a certain pattern or code, sometimes called the spreading code, known at the PMCW radar receiver. The transmitted signal is phase modulated by mixing a baseband signal (e.g., with two values +1 and −1) with a local oscillator to generate a transmitted signal with a phase that is changing corresponding to the baseband signal (e.g., +1 corresponding to a phase of 0 radians and −1 corresponding to a phase of $\pi$ radians). For a single transmitter, a sequence of phase values that form the code or spreading code that has good autocorrelation properties is required so that ghost objects are minimized. The rate at which the phase is modulated determines the bandwidth of the transmitted signal and is called the chip rate.

In a PMCW radar system, the receiver performs correlations of the received signal with time-delayed versions of the transmitted signal and looks for peaks in the correlation. The time-delay of the transmitted signal that yields peaks in the correlation corresponds to the delay of the transmitted signal when reflected off an object. The distance to the object is found from that delay and the speed of light.

A radar system utilizes one or more transmitters to transmit signals. These signals are reflected from objects (also known as targets) in the environment and received by one or more receivers of the radar system. A transmitter-receiver pair is called a virtual radar (or sometimes a virtual receiver).

The transmitted radio signal from each radar transmitter consists of a baseband transmitted signal, which is up-converted to an RF signal by an RF upconverter. The up-converted RF signal may be obtained by mixing the baseband transmitted signal with a local oscillator signal at a carrier frequency. The baseband transmitted signal used for transmission by one transmitter of the radar system might be phase modulated using a series of codes. These codes, for example, consist of repeated sequences of random or pseudo-random binary values for one transmitter, e.g., (−1, −1, −1, −1, 1, 1, 1, −1, 1, 1, −1, −1, 1, −1, 1), although any sequence, including non-binary sequences and non-periodic sequences could be used and different sequences could be used for phase modulating the outputs of different transmitters. Each value of the phase modulation code sequence is often called a chip. A chip would last a certain duration called the chip time. The inverse of the chip time is the chip rate. That is, the chip rate is the number of chips per second. In an exemplary aspect of the present invention, the sequences of random binary values may be provided by a truly random number generator. A truly random number generator is explained in more detail in U.S. Pat. No. 9,575,160, which is hereby incorporated by reference herein in its entirety. The random bit stream (with values +1 or −1) from the truly random number generator may be multiplied with an output of pseudorandom binary values from a pseudorandom number generator (PRNG).

The transmitted radio signals are reflected from objects in the environment and are received back at the radar receivers (or virtual receivers). Each object in the environment may reflect the transmitted radio signal. The received radio signal at the radar system would consist of the sum of the radio signals reflected from various objects (targets) in the environment. In addition, a second radar system operating in the vicinity of the first radar system will generate a transmitted radio signal that may be received by the first radar system and interfere with the reflected radio signals from the first radar system. In other words, the first radar system would receive radio signals that include radio signals from transmitters of the first radar system that are reflected from objects in the environment, as well as radio signals transmitted by one or more other radar systems.

At the receiver (receive pipeline) of the radar system, the received radio signal is down-converted by typical amplification, filtering, and mixing with in-phase and quadrature-phase components of an oscillator. The output after down-conversion and sampling is a sequence of complex value digitized samples comprising a mathematical real component and a mathematical imaginary component that are provided to a processor. The baseband signals used at the transmitter and the reflected radio signals after down-conversion in the receiver are provided to correlators. The complex valued digitized samples at the output of the down-converter are correlated with various time-delayed replicas of the baseband transmitted signals for different receivers to produce complex correlation values over a certain duration. That is, a sequence of digitized samples that correspond to a certain time duration of the received signal are correlated with a time-delayed replica of the baseband transmitted signal. The process is repeated for subsequent samples, thus producing a sequence of complex correlation values for a given time-delay. This process is also performed for different transmitter/receiver pairs (virtual receivers).

A selected correlator that has a replica that is matched in delay to the time delay of the reflected radio signal from an object will produce a large magnitude complex correlator output. A single correlator will produce a sequence of correlator outputs that are large if the reflected signal has a delay that matches the delay of the replica of the baseband transmitted signal. If the velocity of the radar system is different from the velocity of the object causing the reflection, there will be a Doppler shift in the frequency of the reflected signal relative to the transmitted signal. A sequence of correlator outputs for one particular delay corresponding to an object moving in the environment will have complex values that rotate at a rate related to the Doppler shift. Using a sequence of correlator outputs (also referred to as a scan), the Doppler shift may be estimated, and thus the velocity of the object in the environment determined. The longer the sequence of correlator outputs used to estimate the Doppler frequency, the greater the accuracy and resolution of the estimation of the Doppler frequency, and thus the greater the accuracy in estimating the velocity of the object.

The correlation values for various time delays and various virtual radars are arranged in two-dimensional arrays known as time slices. A time slice is a two-dimensional array with one dimension corresponding to delay or range bin and the other dimension corresponding to the virtual radar (transmitter-receiver pair). The samples are placed into respective range bins of the two-dimensional array (as used herein, a range bin refers to a distance range corresponding to a particular time delay corresponding to the round-trip time of the radar signal from a transmitter, to the target/object, and back to the receiver). The virtual receivers of the radar system define one axis of the two-dimensional time slice and the range bins define the second axis of the two-dimensional time slice. Another new time slice comprising complex correlation values is generated every 2-30 microseconds. Over a longer time interval, herein referred to as a "scan" (typically, in a duration of 1-60 milliseconds or longer), multiple time slices are accumulated to form a three-dimensional radar data cube. One axis or dimension of the three-dimensional radar data cube is defined by time (of each respective time slice requiring 2-30 microseconds), while the receivers (or virtual radar) define a second axis of the three-dimensional radar data cube, and the range bins and their corresponding time delays define a third axis of the three-dimensional radar data cube. A radar data cube may have a preselected or dynamically defined quantity of time slices. For example, a radar data cube may include 100 time slices or 1000 time slices of data. Similarly, a radar data cube may include different numbers of range bins. The optimized use of radar data cubes is described in detail in U.S. Pat. No. 9,599,702, which is hereby incorporated by reference herein in its entirety.

A single correlator output corresponding to a particular range bin (or delay) is a complex value that corresponds to the sum of products between a time-delayed replica of the baseband transmitted signal—with a time-delayed replica corresponding to each range bin—and the received down-converted complex samples. When a particular time-delayed replica in a particular range bin correlates highly with the received signal, it is an indication of the time delay (i.e., range of the object) for the transmitted radio signal that is received after the transmitted radio signal reflects from an object. Multiple correlators produce multiple complex correlation values corresponding to different range bins or delays. As discussed herein, each time slice contains one correlation value in a time series of correlation values upon which Doppler processing is performed (e.g., Fast Fourier Transform). In other words, a time series of complex correlation values for a given range bin is used to determine the Doppler frequency and thus the velocity of an object in the range bin. The larger the number of correlation values in the time series, the higher the Doppler resolution. A matched filter may also be used to produce a set of outputs that correspond to the correlator outputs for different delays.

There may be scans for different correlators that use replicas of the transmitted signal with different delays. Because there are multiple transmitters and multiple receivers, there may be correlators that process a received radio signal at each receiver that are matched to a particular transmitted radio signal by a particular transmitter. Each transmitter-receiver pair is called a "virtual radar" (a radar system preferably has 4 virtual radars, or more preferably 32 virtual radars, and most preferably 256 or more virtual radars). The receive pipeline of the radar system will thus generate a sequence of correlator outputs (time slices) for each possible delay and for each transmitter-receiver pair. This set of data is called a radar data cube (RDC). The delays are also called range bins. The part of the radar data cube for one point in the sequence of correlator outputs is called a time slice, and it contains one correlator output for each range bin and transmitter-receiver pair combination.

The complex-valued correlation values contained in a three-dimensional radar data cube may be processed, preferably by a processor established as a CMOS processor and coprocessor on a semiconductor substrate, which is typically a silicon substrate. In one embodiment, the processor comprises fixed function and programmable CPUs and/or programmable logic controls (PLCs). Preferably, the system will be established with a radar system architecture (including, for example, analog RF circuitry for the radar, processor(s) for radar processing, memory module(s), and other associated components of the radar system) all on a common semiconductor substrate. The system may preferably incorporate additional processing capabilities (such as, for example, image processing of image data captured by one or more vehicle cameras such as by utilizing aspects of the systems described in U.S. Pat. Nos. 5,877,897; 5,796,094; 6,396,397; 6,690,268 and 5,550,677, which are hereby incorporated herein by reference in their entireties) within the same semiconductor substrate as well.

The ability of a continuous wave radar system to distinguish multiple targets is dependent upon the radar system's range, angle, and Doppler resolutions. Range resolution is limited by a radar's bandwidth (i.e., the chip rate in a phase modulated continuous wave radar), while angle resolution is limited by the size of the antenna array aperture. Meanwhile, increasing Doppler resolution only requires a longer scan. A high Doppler resolution is very valuable because no matter how close two objects or targets are to each other, as long as they have slightly differing radial velocity (their velocity towards or away from the radar system), they can be distinguished by a radar system with a sufficiently high enough Doppler resolution. As discussed herein, the detection of objects with a PMCW radar system may be adversely effected by the nearby operation of one or more frequency modulated continuous wave (FMCW) radar systems.

The radar sensing system of the present invention may utilize aspects of the radar systems described in U.S. Pat. Nos. 9,575,160 and/or 9,599,702, and/or U.S. patent application Ser. No. 15/481,648, filed Apr. 7, 2017, Ser. No. 15/416,219, filed Jan. 26, 2017, and/or Ser. No. 15/292,755, filed Oct. 13, 2016, and/or U.S. provisional applications, Ser. No. 62/382,857, filed Sep. 2, 2016, Ser. No. 62/381,808, filed Aug. 31, 2016, Ser. No. 62/327,003, filed Apr. 25, 2016, Ser. No. 62/327,004, filed Apr. 25, 2016, Ser. No. 62/327,005, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, and/or Ser. No. 62/327,018, filed Apr. 25, 2016, which are all hereby incorporated by reference herein in their entireties.

FIG. 1 illustrates an exemplary radar/communications system 100 configured for use in a vehicle 150. In an aspect of the present invention, a vehicle 150 may be an automobile, truck, or bus, etc. As illustrated in FIG. 1, the radar/communications system 100 may comprise one or more transmitters and one or more receivers 104a-104d for a plurality of virtual receivers. Other configurations are also possible. As illustrated in FIG. 1, the radar/communications system 100 may comprise one or more receivers/transmitters 104a-104d, control and processing module 102 and indicator 106. Other configurations are also possible. FIG. 1 illustrates the receivers/transmitters 104a-104d placed to acquire and provide data for object detection and adaptive cruise control. In addition, these transmitters/receivers can also communicate information bits to other systems mounted on a different vehicle. The radar/communications system 100 (providing such object detection and adaptive cruise control or the like) may be part of an Advanced Driver Assistance System (ADAS) for the automobile 150. The communication with other adjacent vehicles may allow additional information, available to the adjacent vehicle but not to automobile 150, to be available at automobile 150 for better ADAS performance, which is otherwise not visible to it.

Figure 2A:
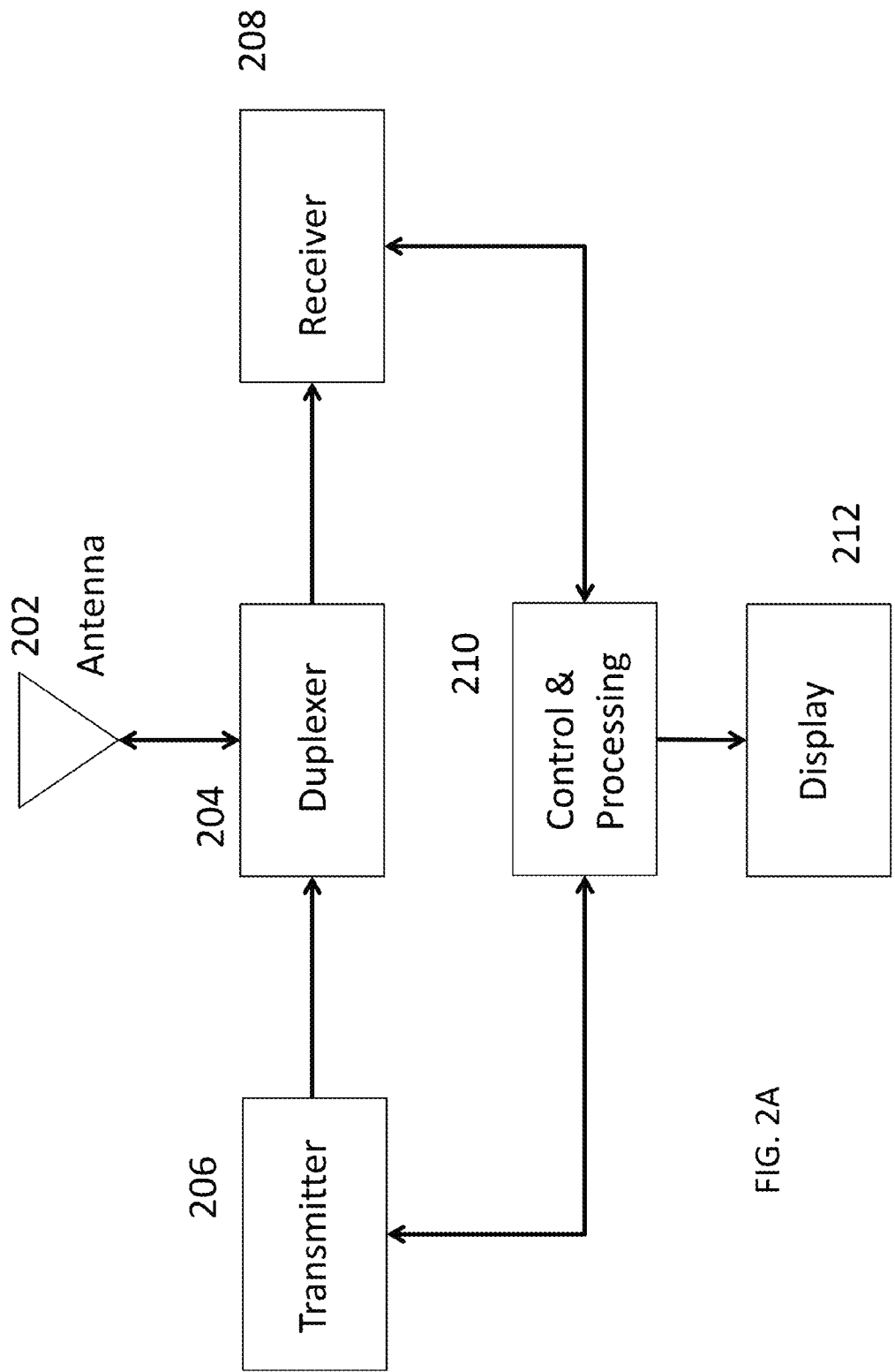
FIG. 2A and FIG. 2B are block diagrams of a single transmitter and receiver in a shared radar and communications system, in accordance with the present invention.
Figure 2B:
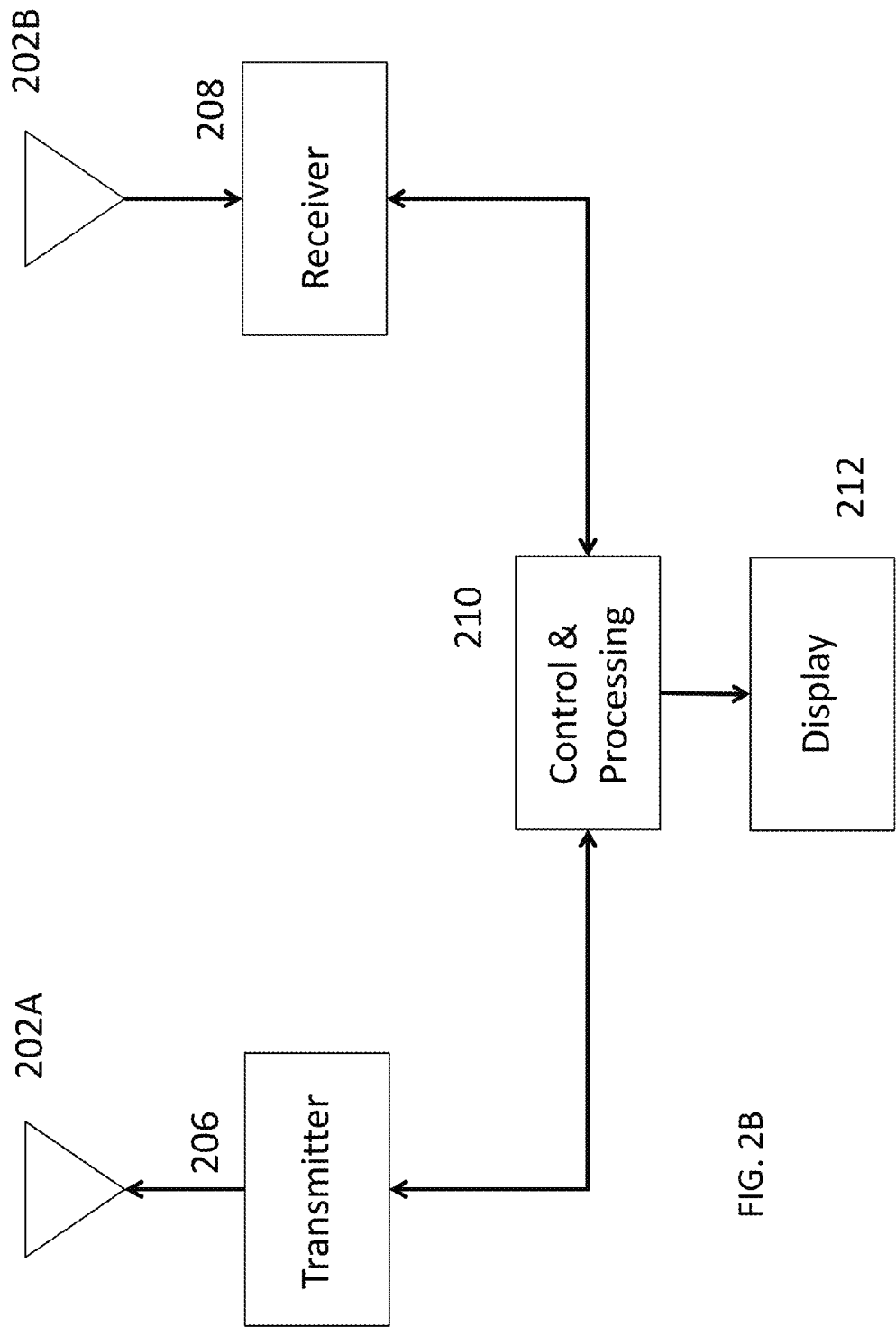

There are several ways to implement a shared radar and communication system. One way, shown in FIG. 2A uses a single antenna 202 for transmitting and receiving. The antenna is connected to a duplexer 204 that routes the appropriate signal from the antenna to the receiver 208 or routes the signal from the transmitter 206 to the antenna 202. A control processor 210 controls the operation of the transmitter and receiver and estimates the range and velocity of objects in the environment. The control processor is also responsible for modulating any desired information bit for transmission as well for decoding any information bits transmitted from other similar systems. A second way to implement a radar system is shown in FIG. 2B. In this system, there are separate antennas for transmitting (202A) and receiving (202B). A control processor 210 performs the same basic functions as in FIG. 2A. In each case, there may be a display 212 that receives display information from the control processor 210 to display or visualize the location of objects in the environment and the information obtained from other systems.

Figure 3:
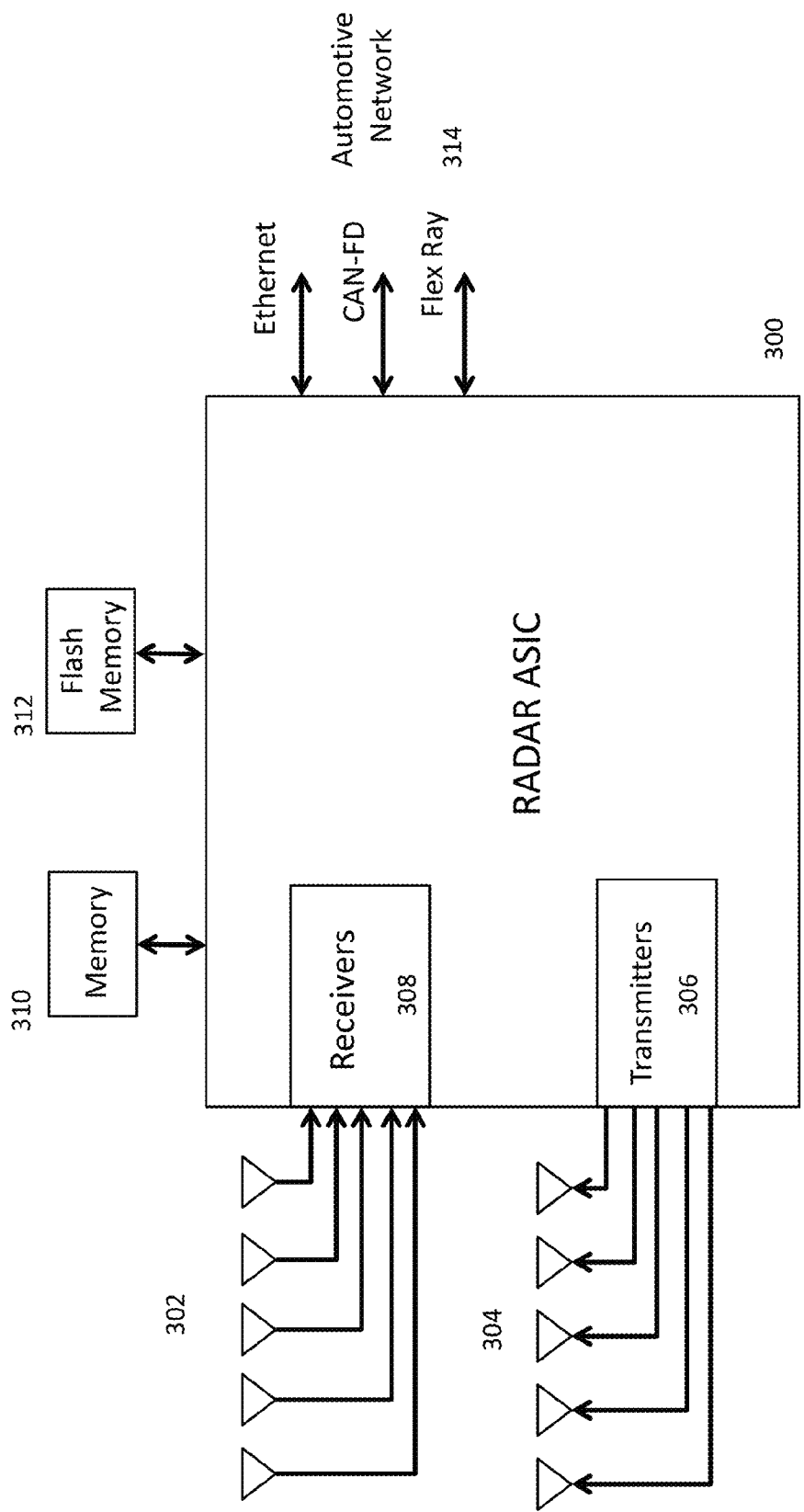
FIG. 3 is a block diagram of a plurality of receivers and a plurality of transmitters (MIMO) in a shared radar and communication system, in accordance with the present invention.

An exemplary shared radar and communications system 300 with multiple antennas, transmitters, and receivers (MIMO) is illustrated in FIG. 3. Using multiple antennas allows a MIMO system to determine the angle (azimuth or elevation or both) of targets/objects in the environment. Depending on the geometry of the antenna system, different angles (e.g., azimuth or elevation) can be determined. A MIMO configuration also allows the system to determine the angle of any other system that it is communicating with. The MIMO system can then focus on that particular angle for communicating with the remote system.

The shared radar and communications system 300 may be connected to a network via an Ethernet connection or other types of network connections 314. The system 300 will have memory (310, 312) to store software used for processing the signals in order to determine range, velocity and location of objects. The software also performs necessary operations to modulate the information bits onto the radar signal as well as extracting information bits embedded in the radar signals from other similar systems. Memory can also be used to store information about targets in the environment.

Figure 4:
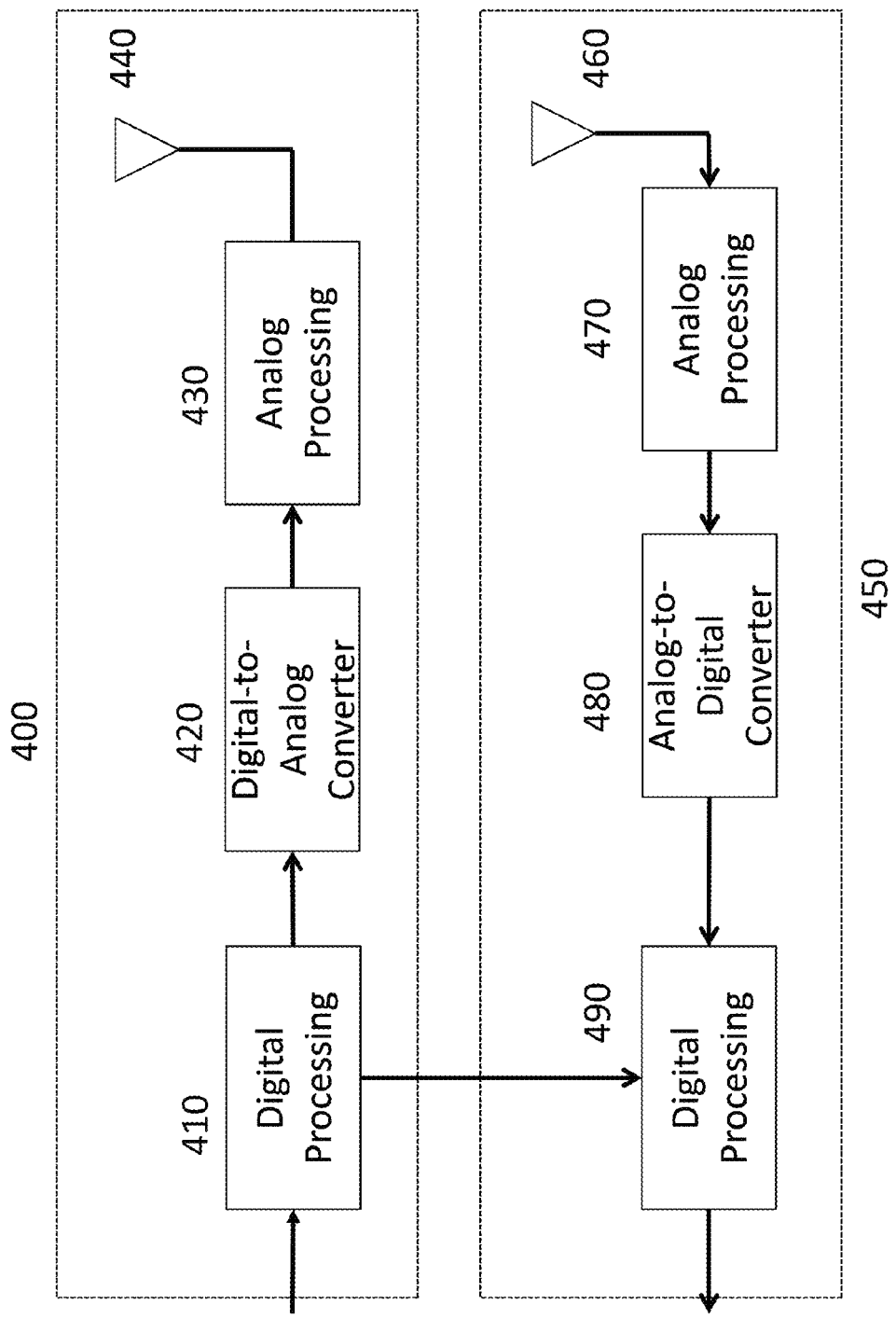
FIG. 4 is a block diagram of a single receiver and a single transmitter, in accordance with the present invention.

A basic block diagram of a PMCW system with a single transmitter and receiver is illustrated in FIG. 4. The transmitter 400, illustrated in FIG. 4, consists of a digital processing block 410, followed by a digital-to-analog converter (DAC) 420. The digital processing block 410, also known as a digital signal generator 410, is capable of accepting external information bits and modulating them onto the transmitted signal. The output of the DAC 420 is up-converted to a radio frequency (RF) signal and amplified by an analog processing unit 430. The result is then output to the input of the antenna 440. The digital signal generator 410 generates a baseband signal. The receiver 450, illustrated in FIG. 4, consists of a receiving antenna 460, an analog processing unit 470 that down amplifies the signal and mixes the signal to baseband. This is followed by an analog-to-digital converter (ADC) 480 and then digital baseband processing 490. There is also a control processor (illustrated as the control & processing block 210 in FIGS. 2A and 2B) that controls the operation of the transmitter 400 and receiver 450. The baseband processing will process the received signal and may generate data that can be used to determine range, velocity and angle. The baseband processing will also process any information bits that need to be communicated and/or any signals received from other systems that have information contained in the signals.

It is possible to use the concept described herein with various means for modulating the data onto a transmitted signal. For example, it is possible to use a variety of modulation techniques including Gaussian minimum shift keying (GMSK) modulation scheme which provides better control of the power spectrum of the output signal. In another embodiment, an orthogonal frequency division multiplex (OFDM)-based modulation scheme, which spreads the information into the time-frequency plane can be used for a shared use of radar detection and communication.

Figure 5:
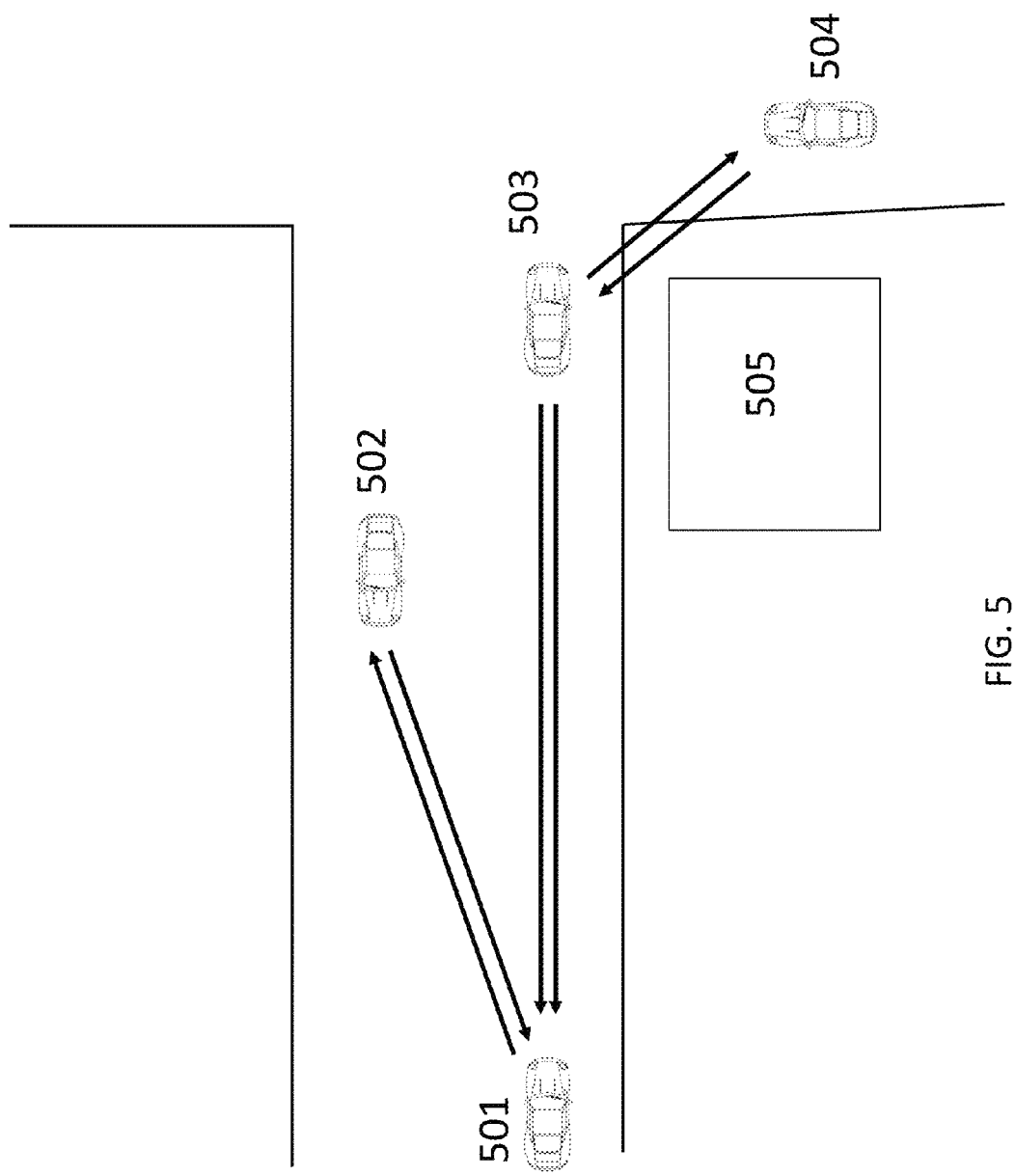
FIG. 5 is a plan view of an environment illustrating multiple vehicles equipped with shared radar and communications systems operating in that environment, in accordance with the present invention.

FIG. 5 illustrates one way in which vehicles equipped with such a shared radar and communication system can provide better performance than a simple radar system. Vehicles 501-504 are equipped with systems according to the present invention. Vehicle 501 can detect and communicate with vehicles 502-503 but cannot detect nor communicate with vehicle 504 due to an obstacle (such as building 505) at the cross-section. However, vehicle 503 can detect and communicate with vehicle 504. Vehicle 503 can then communicate to vehicle 501 the location and presence of vehicle 504 at the crossroad. This will allow vehicle 501's ADAS system to make a better decision. Other scenarios are easy to imagine. If vehicle 502 is instead directly in front of vehicle 501, vehicle 502 could block the view of vehicle 503 from the radar system in vehicle 501. The information about vehicle 503 could be communicated from vehicle 502 back to vehicle 501.

As mentioned herein, there are various types of signals used in radar systems. One type of continuous wave radar signal is known as phase-modulated continuous-wave (PMCW). The phase of the transmitted signal is varied in PMCW systems. Often, the variation of the phase is according to a spreading code. The spreading code may be binary (e.g., +1 and −1), in which case the phase of the transmitted signal at any time takes on one of two possible values (e.g., 0 and $\pi$ radians). Spreading codes with more than two levels can also be used. Often, the code repeats after a certain time duration, sometimes called the pulse repetition interval (PRI). Various types of spreading codes can be used. These include pseudorandom binary sequence (PRBS) codes also called m-sequences, almost perfect autocorrelation sequences (APAS), Golay codes, constant amplitude zero autocorrelation codes (CAZAC), also known as Frank-Zadoff-Chu (FZC) sequences, as well as many other codes that can be used. In a radar system with a single antenna, a single spreading code is used. The autocorrelation of this single code determines the capability of the radar to estimate the range (range resolution and maximum unambiguous range).

In a multiple-input, multiple-output (MIMO) system, there are multiple transmitters that operate simultaneously. Each transmitter uses a spreading code and thus multiple codes are needed, one for each transmitter. In this case (multiple transmitters), codes that have good autocorrelation, as well as good cross-correlation properties are desirable. Generally, the better the autocorrelation of codes, the worse the cross-correlation properties.

Systems with multiple transmitters can also be used to transmit the same spreading code. In this case, by controlling the phase of each transmitter, one can transmit more power in a given direction. This is known as phased array beamforming in the industry.

Figure 6:
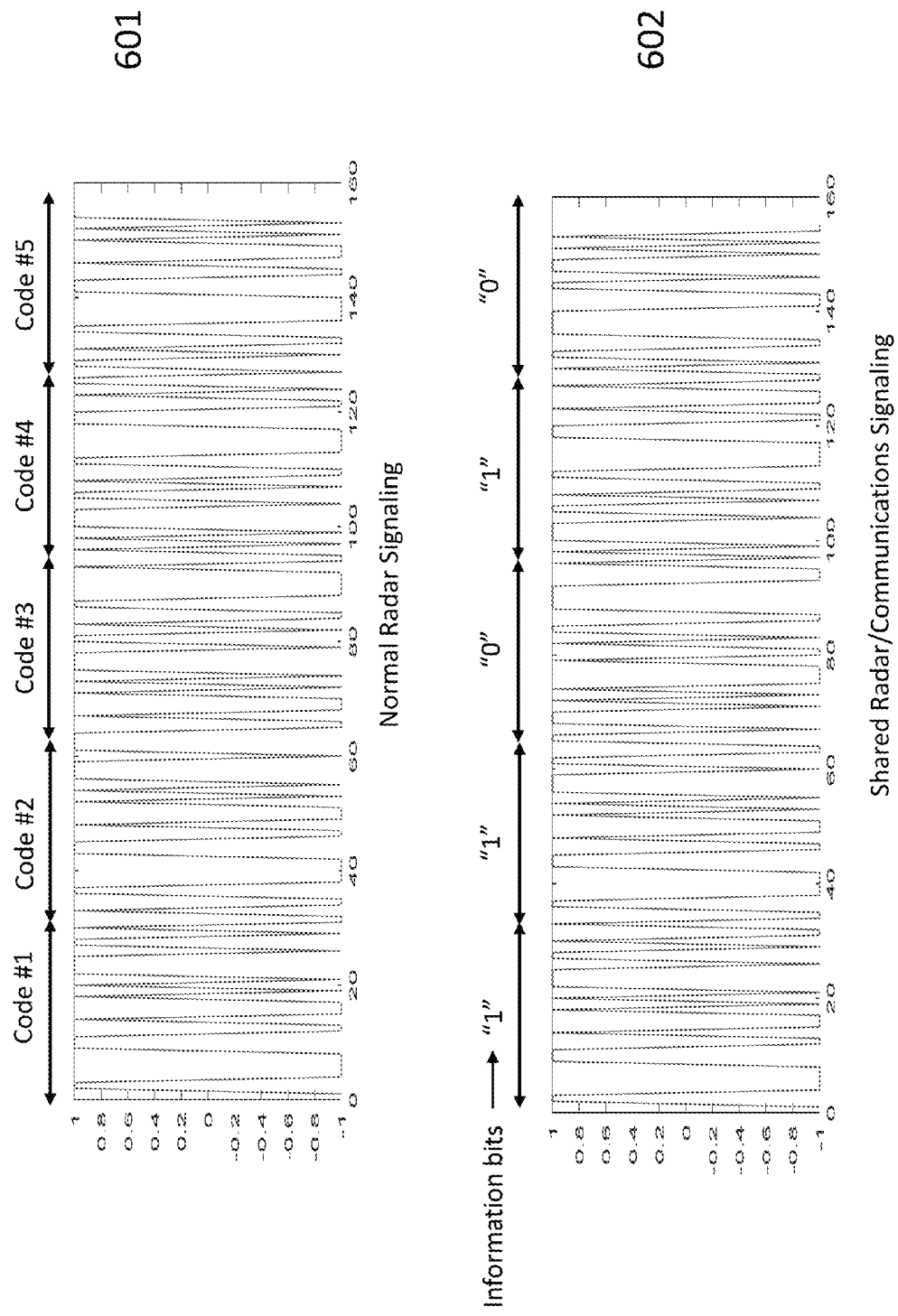
FIG. 6 is a graph illustrating an exemplary transmitted signal of a spreading code used in a PMCW radar and used to transmit information bits, in accordance with the present invention.

In order to achieve communication shared with radar communication, information bits can be incorporated into the spreading codes (for modulating a transmit signal) in various ways. In one preferred embodiment, information bits are modulated on the transmit signal on a spreading code basis. In this case, one can choose any of the codes mentioned earlier, e.g., almost perfect autocorrelation sequences (APAS), Golay codes, constant amplitude zero autocorrelation codes (CAZAC), or m-sequences. FIG. 6 illustrates an example of such a binary (two-valued) spreading code: an m-sequence with length 31 (601). Five such code sequences are shown. Sequence 602 illustrates the waveform for information bit sequence "11010". The first two sequences and the fourth sequence are modulated with bit "1" and are thus sent as is. The third and the fifth sequence are modulated with bit "0" and hence sign inversed. After comparing the received signal from a remote radar system and correlating with the corresponding sequence, the system can determine which of the information bits ("0" or "1") has been used to modulate the spreading code. In this case, the receiver needs knowledge of the codes used at the transmitter.

Figure 7:
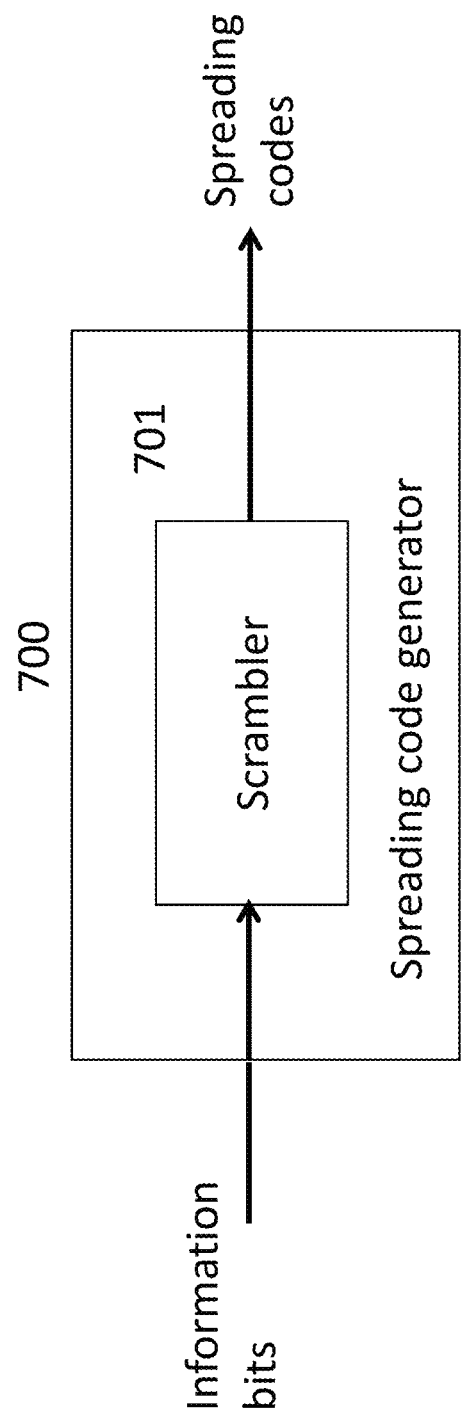
FIG. 7 is a block diagram illustrating an exemplary spreading code generator that uses information bits to generate a spreading code, in accordance with the present invention.

In a preferred embodiment, the information bits are directly modulated onto the spreading codes. Alternatively, the information bits can themselves be used to generate the spreading code. As illustrated in FIG. 7, the information bits are passed through a scrambler 701. The information bits can be used as the initial state of an M-sequence generator. A typical scrambler uses a linear feedback shift register (LFSR) circuit that generates a sequence depending on the initial state and the feedback connections. The information bits can be used to decide on the initial state or the information bits can be used to decide the feedback connections used. The output has the properties of a PRBS sequence with good auto and cross-correlation properties. If the information bits are directly modulated onto the spreading codes, the information bits can be recovered from the received signal if the initial state and specific properties of the LFSR are known to the receiver. If the information bits are used to select a spreading or scrambling code, then correlators with various possible spreading codes are used to recover the information bits at the receiver. The output of the scrambler 701 can also be used as the spreading code for radar transmission. Another technique that can be used to transmit information is done using orthogonal frequency division multiplexing (OFDM). In this case, multiple carriers are used to transmit information. As is well known, OFDM can use an inverse Fourier transform to generate a time domain signal for transmission and then at the receiver use a Fourier transform to recover the information. Different information can be transmitted on different frequencies, or the information can be encoded with an error control code, and then the coded information can be transmitted on different frequencies.

Before modulation, the information bits can be differentially encoded. This means that instead of sending the bits themselves, the difference of a current bit to a previous bit is sent. Mathematically, this operation is equivalent to $d_k = b_k \oplus b_{k-1}$, where $\oplus$ represents a Boolean XOR operation. This makes the communication system robust to constant phase rotation, such as what might be experienced as the transmitter and the receiver are not moving at a same velocity.

As illustrated in FIG. 4, the received signal is down-converted to a complex baseband signal via an RF front end analog signal processing block 470. The analog signal processing involves amplification, mixing with a local oscillator signal, and filtering. The mixing is with two sinusoidal signals that are 90 degrees out of phase (e.g., cosine and sine, or in-phase and quadrature-phase signals). After down-conversion, the complex analog baseband signal is converted to a complex baseband digital signal using analog-to-digital converters (ADCs) 480. The complex baseband digital signal (output by the ADCs 480) is then the input to a digital processing unit 490.

The complex baseband output consists of two aspects of the signal. A first aspect includes reflections from objects that are copies of the transmitted signal. A second aspect includes information bits that are transmitted by other systems. For example, in FIG. 5, the combined radar and communications system in vehicle 501 receives reflections of its own transmitted signal from vehicle 502-503. In addition, the combined radar and communications system has also received signals transmitted by the combined radar and communications systems in vehicles 502-503.

Figure 8:
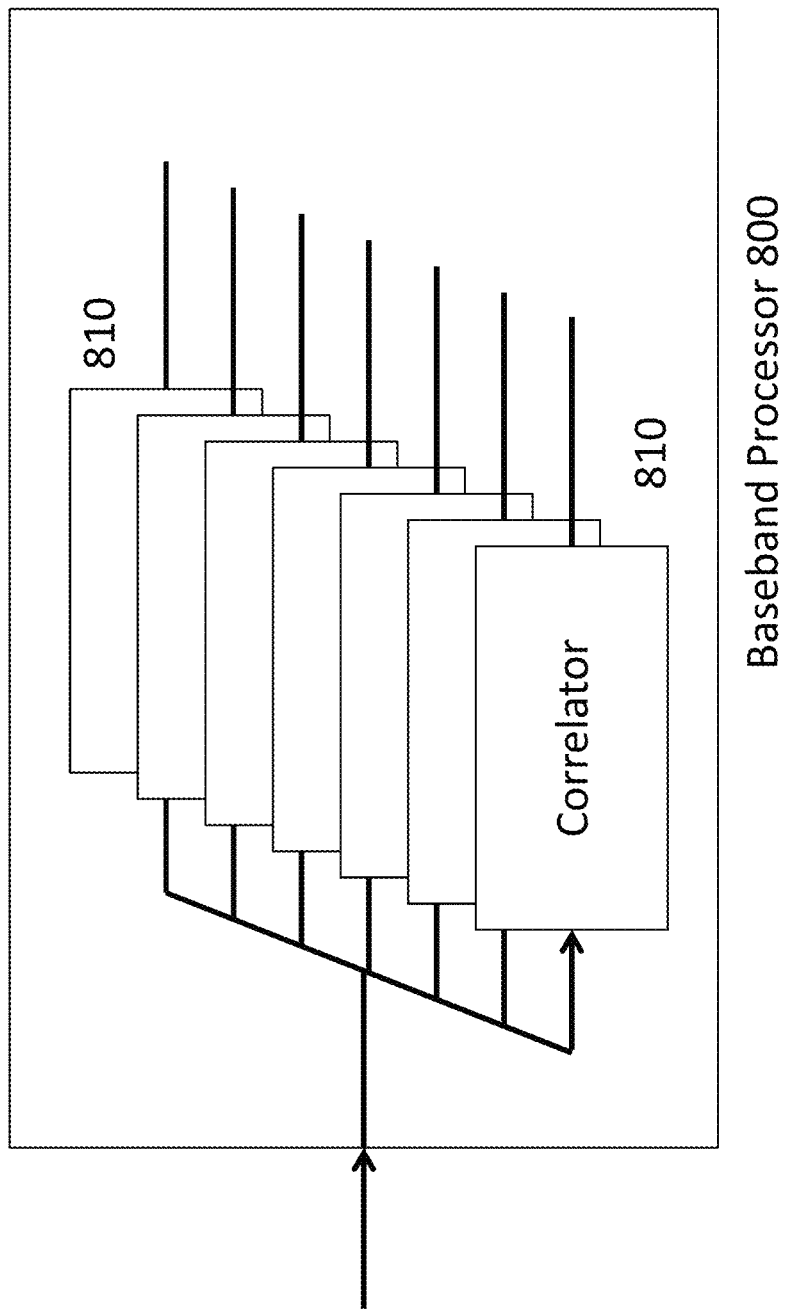
FIG. 8 is a block diagram illustrating an exemplary bank of correlators used for both radar detection and information bit extraction, in accordance with the present invention.
Figure 9:
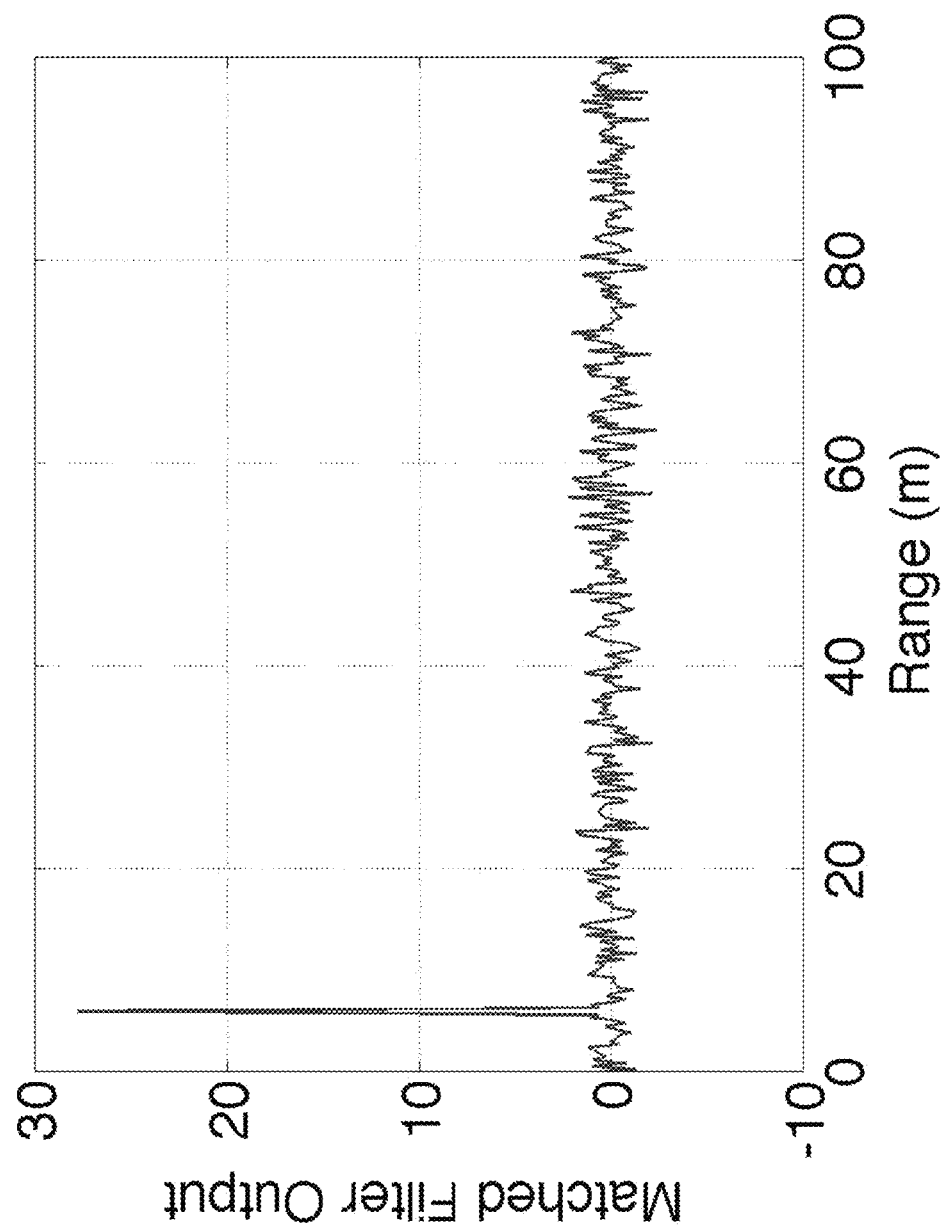
FIG. 9 is a graph illustrating signal peak of a reflected signal when correlated with a known transmitted spreading code, in accordance with the present invention.

Referring to FIG. 4, the digital processing block 490 performs correlations or matched filtering. The correlators multiply the received complex baseband signal by a delayed replica of the baseband transmitted signal. The result is accumulated over a certain time interval. As illustrated in FIG. 8, a bank of correlators 810, where each correlator 810 has a different delay used for the replica of the baseband transmitted signal, will produce a set of correlations that correspond to different ranges of objects. In essence, a correlator that has a particular delay of the baseband transmitted signal is looking for the presence of a reflection from an object at a distance corresponding to the particular delay for the particular correlator, and for which the round-trip delay is the delay used for the baseband transmitted signal. Such a peak is illustrated in FIG. 9, where the peak in the matched filter output represents an object at the distance of reflection. The cross correlation between those signals with its own transmitted signal, and those transmitted by others, will be low and thus only reflected signals will show the peak.

Figure 10:
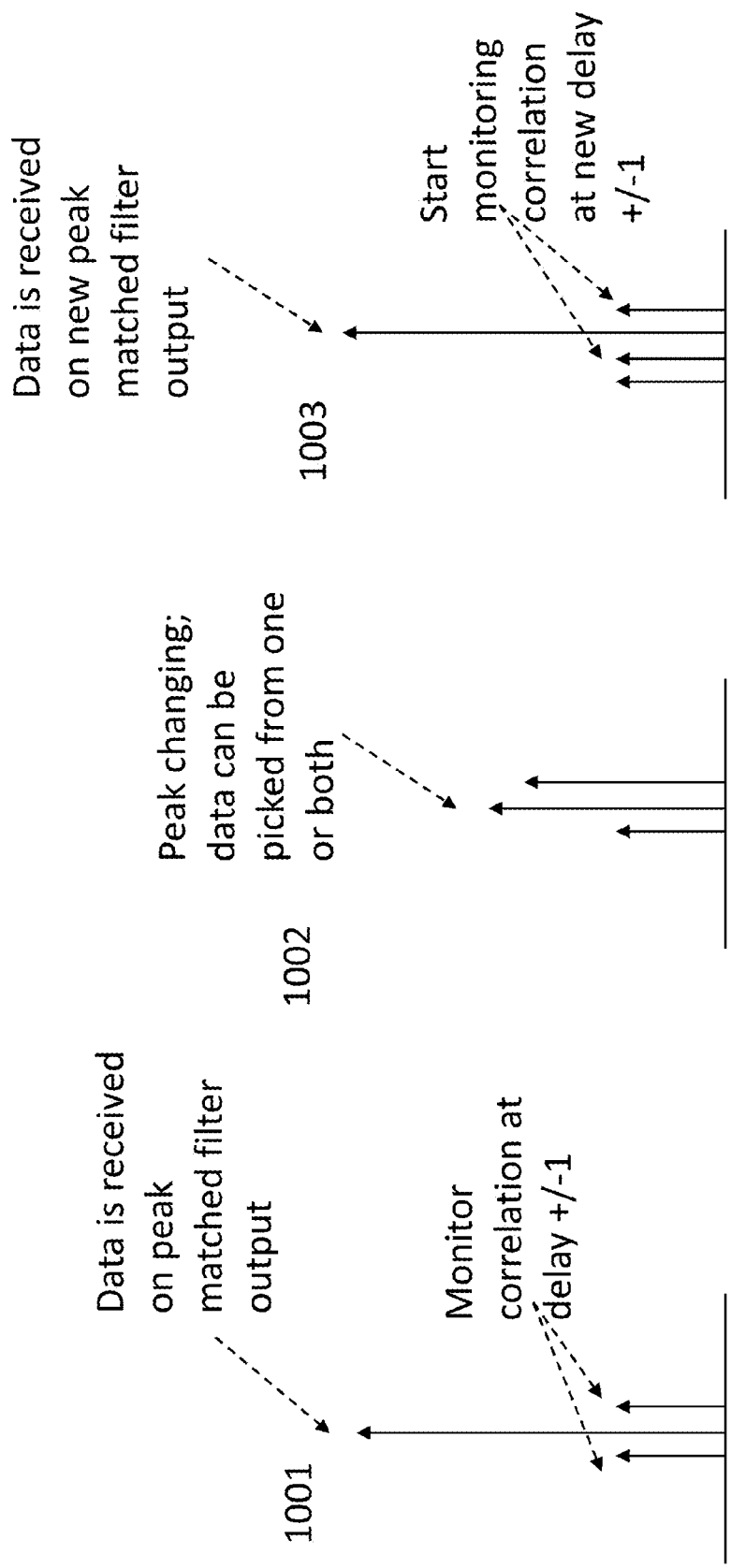
FIG. 10 is a diagram illustrating an exemplary process for tracking and extracting information bits where either the transmitting system or the receiving system, or both are moving, in accordance with the present invention.

In one preferred embodiment, the information bits are transmitted based on the scheme illustrated in FIG. 6. The correlator 810 performs a correlation with a replica of the spreading code used by the remote transmitting system. The value at the peak will correspond to the bit sent (potentially rotated by some phase depending on the channel between the transmitter system and the receiver system). An initial search may be needed to locate the peak across delayed replicas of the spreading code used by the transmitter. Once the peak is found, the receiver will continue to calculate the correlation with +/−1 delay from the peak. This is illustrated in FIG. 10. 1001 is the case when a peak has been found and data is decoded from the peak. However, the two neighboring delays are being monitored. As the vehicles move, the peak will move from one delay to the next. 1002 shows the case during cross-over. The data can be decoded from the larger of the peaks or from an average value on the two peaks. 1003 is the case when data is now recovered for the peak at a new location and the two new neighboring delays are monitored. This embodiment requires that the receiver has knowledge of the spreading code used by the transmitter of the other system.

In another preferred embodiment, the information bits are transmitted based on the scheme illustrated FIG. 7. Here, the data is directly recovered from the ADC samples. In case of a differentially encoded case, the phase differences of the ADC samples are used to recover the data. This embodiment requires a higher SNR than the one described earlier. However, the radar reflection signals cover twice the distance from that of the signal from a remote object at the same distance and hence, the signal with information bits to be decoded is expected to be at a much higher signal level than the reflected own signals used for radar detection.

Figure 11:
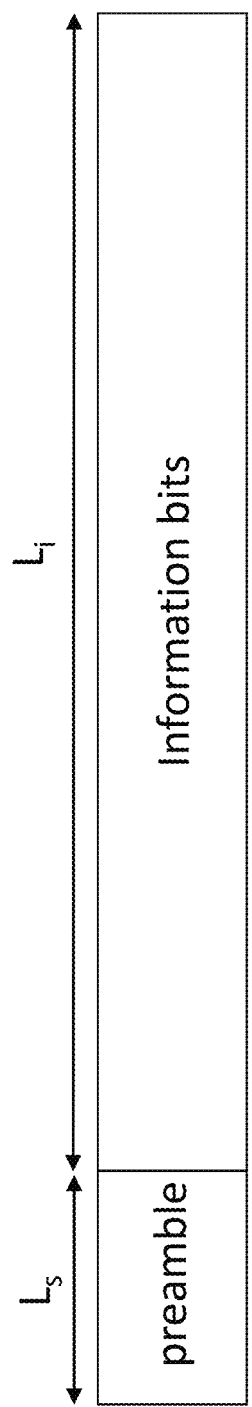
FIG. 11 is a block diagram illustrating an exemplary data block structure, in accordance with the present invention.

The information bits can be arranged in blocks as illustrated in FIG. 11. The block size is determined based upon a frequency and timing offset between the transmitter and receiver system. The block of FIG. 11 is prepended with start bits (also known as a preamble) comprising a known bit sequence that can be used to determine the start of the block at the receiver. In the case of a signaling scheme illustrated in FIG. 6, the start bits can be modulated with the same and a known spreading code for easier detection. As an exemplary embodiment, a preamble size of 16 bits and a block size of 100 information bits are used.

The system can be enhanced through the use of various channel coding systems as are known in the industry. The channel coding mechanism can include simple repetition coding, where the same data block is repeated several times, or more advanced channel coding schemes like convolutional coding, block coding, turbo coding, or low density parity check coding.

Figure 12:
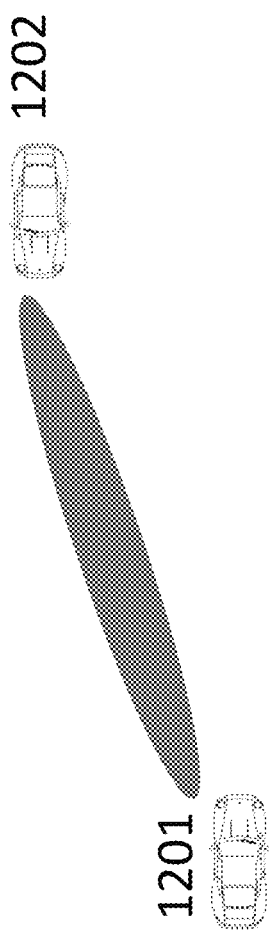
FIG. 12 is a plan view of an environment illustrating the exploitation of directionality to focus beams for better communication, in accordance with the present invention.

The description herein includes a shared radar and communication system in which there are $N_T$ transmitters and $N_R$ receivers. For radar detections, this results in $N_T \times N_R$ virtual radars, one for each transmitter-receiver pair. For example, a radar system with eight transmitters and eight receivers will have 64 pairs or 64 virtual radars (with 64 virtual receivers). This set of virtual receivers can be used to determine the angle of arrival (AOA) of reflection signals. For communication, only the $N_R$ receivers can be used to determine the AOA of the received signal. These $N_R$ receivers can then be used to focus the signal reception in the given direction to increase a signal level. The $N_T$ transmitters can also be used to focus the transmitted signal in any desired direction. This is illustrated in FIG. 12. The information exchanged between vehicle 1201 and 1202 is done with focusing the signal transmission and reception directions in the direction of each other.

If the multiple transmitters and the multiple receivers are used to focus (beam form) information bit transmission and reception in a given direction, the radar detection can only be done in the region covered by the signal transmission. In one preferred embodiment, the shared radar and communication system takes a time division multiplexing approach. In this method, the system alternately uses a broad transmission for radar detection and a narrow focused transmission for communications. In another preferred embodiment, the system allocates a subset of transmitters and receivers for broad transmission used in radar detection and a different subset for narrow focused transmission used for communication. In this case, radar detection and communications can be carried out simultaneously.

The system can analyze the radar detection data to analyze the potential sources of other systems to be communicated with and design transmission parameters such as transmission direction and power, and necessary coding based on location(s) of the remote systems. The system can also take data from external sources, such as: camera based systems, and a GPS map to analyze potential sources to be communicated with and optimize thereof.

The information available from other vehicles received over a communication channel can also be used to optimize operations of the radar in a shared radar and communications system. If an advanced knowledge of locations with vulnerable road users (VRU), such as pedestrians, is available to a vehicle not yet visible in a radar screen, the system can design radar scans optimized to identify the activities of such VRU beforehand.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A shared radar sensing and communications system for a vehicle, the system comprising:
    a transmitter configured for installation and use on a vehicle, wherein the transmitter is configured to modulate a radio signal based upon a first plurality of information bits;
    a control unit configured to select the first plurality of information bits used to modulate the radio signal;
    wherein the transmitter is configured to transmit the modulated radio signal;
    a receiver configured for installation and use on the vehicle, wherein the receiver is configured to receive a first radio signal that is the transmitted modulated radio signal reflected from objects in the environment;
    wherein the receiver is configured to receive a second radio signal transmitted from another system, wherein the second radio signal carries second radio signal information bits, wherein the receiver receives both the first radio signal and the second radio signal, and wherein a correlator of the receiver is configured to process both the first radio signal and the second radio signal; and
    wherein the correlator of the receiver is configured by the control unit to process the first received radio signal to detect objects in the environment, and to also process the second received radio signal to determine a second plurality of information bits carried by the second received radio signal.

2. The system of claim 1 further comprising a plurality of transmitters and a plurality of receivers.

3. The system of claim 1, wherein the transmitter comprises a digital processing unit, a digital-to-analog converter, an analog processing unit, and a transmit antenna.

4. The system of claim 1, wherein the receiver comprises a receive antenna, an analog processing unit, an analog-to-digital converter, and a digital processing unit.

5. The system of claim 1, wherein one or more spreading codes are used to phase modulate the radio signal.

6. The system of claim 5, wherein the first plurality of information bits are mapped to +1 or −1, and used to modulate or multiply the one or more spreading codes.

7. The system of claim 5 further comprising a spreading code generator configured to generate the spreading code based upon the first plurality of information bits.

8. The system of claim 1, wherein the first and second pluralities of information bits are each arranged in a block structure with a series of preamble bits followed by a finite quantity of information bits.

9. The system of claim 8, wherein a length of the block structure is determined by a frequency and timing offset between the receiver and the other system.

10. The system of claim 1, wherein the receiver comprises a block of correlators configured to correlate the second received radio signal with a second spreading code that was used to modulate the second radio signal to carry the second plurality of information bits.

11. The system of claim 10, wherein three correlators are used to track transmissions of the other system and to extract the second plurality of information bits from the second received radio signal while at least one of the system and the other system is moving relative to the other.

12. The system of claim 1, wherein the second plurality of information bits carries information related to at least one object that is not detected by the receiver and that is detected by the other system.

13. The system of claim 12 further comprising a display, wherein the control unit is configured to send display information to the display to display information related to the at least one object that is not detected by the receiver but that is detected by the other system.

14. A shared radar sensing and communications system for a vehicle, the system comprising:
a plurality of transmitters configured for installation and use on a vehicle, wherein each transmitter of the plurality of transmitters is configured to modulate radio signals using spreading codes based upon a first plurality of information bits;
wherein the plurality of transmitters is configured to transmit the modulated radio signals;
a control unit configured to select the first plurality of information bits used to generate the spreading codes;
a plurality of receivers configured for installation and use on the vehicle, wherein each receiver of the plurality of receivers is configured to receive first radio signals that are the transmitted modulated radio signals reflected from objects in the environment;
wherein each receiver of the plurality of receivers is configured to receive second radio signals transmitted from another system, wherein the second radio signals carry a second plurality of information bits, wherein each receiver of the plurality of receivers receives both the first radio signals and the second radio signals, and wherein a correlator of each respective receiver of the plurality of receivers is configured to process both the first radio signals and the second radio signals; and
wherein the control unit is configured to control the processing of the first received radio signals to detect objects in the environment, and further configured to control the processing of the second received radio signals to determine the second plurality of information bits carried by the second received radio signals.

15. The system of claim 14, wherein a first subset of transmitters of the plurality of transmitters are used in the detection of objects in the environment, and wherein a second subset of transmitters of the plurality of transmitters are used to communicate information bits to the other system.

16. The system of claim 15, wherein the second subset of transmitters of the plurality of transmitters is configured to transmit with a narrowed focus in a direction of the other system, and wherein the first subset of transmitters of the plurality of transmitters is configured to transmit with a broad focus forward of the equipped vehicle.

17. The system of claim 14, wherein the second plurality of information bits carries information related to at least one object that is not detected by the receiver and that is detected by the other system.

18. A shared radar sensing and communications system, the system comprising:
a plurality of transmitters configured for installation and use on a vehicle, wherein each transmitter of the plurality of transmitters is configured to modulate radio signals using spreading codes based upon a first plurality of information bits;
wherein the plurality of transmitters is configured to transmit the modulated radio signals;
a control unit configured to select the first plurality of information bits used to generate the spreading codes;
a plurality of receivers configured for installation and use on the vehicle, wherein each receiver of the plurality of receivers is configured to receive first radio signals that are the transmitted modulated radio signals reflected from objects in the environment;
wherein each receiver of the plurality of receivers is configured to receive second radio signals transmitted from another system, wherein the second radio signals carry a second plurality of information bits, and wherein each receiver of the plurality of receivers receives both the first radio signals and the second radio signals;
wherein the control unit is configured to process the first received radio signals to detect objects in the environment, and further configured to process the second received radio signals to determine the second plurality of information bits carried by the second received radio signals; and
wherein the control unit is configured to direct the plurality of transmitters to transmit with a broad focus forward of the equipped vehicle to detect objects in the environment for a first period of time, and to direct the plurality of transmitters to transmit with a narrow focus in a direction of the other system during a second period of time, and wherein the first and second periods of time repeat in a sequence.

19. A method for managing a shared radar sensing and communications system in a vehicle, the method comprising:
providing a plurality of transmitters configured for installation and use on a vehicle, wherein each transmitter of the plurality of transmitters is configured to modulate radio signals using a spreading code based upon a first plurality of information bits;
selecting the first plurality of information bits used to generate the spreading codes;
transmitting the modulated radio signals with the plurality of transmitters;
providing a plurality of receivers configured for installation and use on the vehicle;
receiving with the plurality of receivers first radio signals that are transmitted modulated radio signals reflected from objects in the environment;
receiving with the plurality of receivers second radio signals transmitted from another system, wherein the second radio signals carry a second plurality of information bits, and wherein each receiver of the plurality of receivers receives both the first radio signals and the second radio signals;
processing with a correlator of each receiver of the plurality of receivers both the first radio signals and the second radio signals; and controlling the processing of the first received radio signals to detect objects in the environment, and further controlling the processing of the second received radio signals to determine the second plurality of information bits carried by the second received radio signal.

20. The method of claim 19 further comprising selecting a first subset of transmitters of the plurality of transmitters to detect objects in the environment, and selecting a second subset of transmitters of the plurality of transmitters to communicate information bits between the other system.

21. The method of claim 20, wherein the second subset of transmitters are configured to transmit with a narrow focus in a direction of the other system.

22. The method of claim 20, wherein the first subset of transmitters are configured to transmit with a broad focus forward of the equipped vehicle.

23. The method of claim 19, wherein the second plurality of information bits carries information related to at least one object that is not detected from processing the first received radio signal but that is detected by the other system.

24. A method for managing a shared radar sensing and communications system in a vehicle, the method comprising:

provlding a plurality of transmitters configured for installation and use on a vehicle, wherein each transmitter of the plurality of transmitters is configured to modulate radio signals using a spreading code based upon a first plurality of information bits;

selecting the first plurality of information bits used to generate the spreading codes;

transmitting the modulated radio signals with the plurality of transmitters;

providing a plurality of receivers configured for installation and use on the vehicle;

receiving with the plurality of receivers first radio signals that are transmitted modulated radio signals reflected from objects in the environment;

receiving with the plurality of receivers second radio signals transmitted from another system, wherein the second radio signals carry a second plurality of information bits;

processing the first received radio signals to detect objects in the environment, and further processing the second received radio signals to determine the second plurality of information bits carried by the second received radio signal; and directing the plurality of transmitters to transmit with a broad focus forward of the equipped vehicle to detect objects in the environment for a first period of time, and directing the plurality of transmitters to transmit with a narrow focus in a direction of the other system during a second period of time, wherein the first and second periods of time repeat in a sequence.

* * * * *